US00RE50177E

(19) United States
(12) Reissued Patent
Kang et al.

(10) Patent Number: US RE50,177 E
(45) Date of Reissued Patent: Oct. 22, 2024

(54) MOBILE DEVICE SYSTEM FOR REMOTE STARTING AND MANAGEMENT OF A VEHICLE

(71) Applicant: Samsung Electronics Co., Ltd., Suwon-si (KR)

(72) Inventors: Soon Ju Kang, Daegu (KR); JaeShin Lee, Gyeongsangbuk-do (KR); Jae Geun Lee, Gyeongsangbuk-do (KR)

(73) Assignee: Samsung Electronics Co., Ltd., Suwon-si (KR)

(21) Appl. No.: 17/139,653

(22) Filed: Dec. 31, 2020

Related U.S. Patent Documents

Reissue of:
(64) Patent No.: 10,166,948
Issued: Jan. 1, 2019
Appl. No.: 15/309,606
PCT Filed: Mar. 6, 2015
PCT No.: PCT/KR2015/002163
§ 371 (c)(1),
(2) Date: Nov. 8, 2016
PCT Pub. No.: WO2015/002163
PCT Pub. Date: Nov. 12, 2015

(30) Foreign Application Priority Data

May 8, 2014 (KR) ..... 10-2014-0054912

(51) Int. Cl.
*B60R 25/10* (2013.01)
*A44C 5/00* (2006.01)
(Continued)

(52) U.S. Cl.
CPC ..... *B60R 25/01* (2013.01); *A44C 5/0015* (2013.01); *B60R 25/04* (2013.01); *B60R 25/10* (2013.01);
(Continued)

(58) Field of Classification Search
CPC ..... B60R 25/01; B60R 25/04; B60R 25/10
See application file for complete search history.

(56) References Cited

U.S. PATENT DOCUMENTS 5,973,611 A 10/1999 Kulha et al.
6,734,790 B1 5/2004 Hodger
(Continued)

FOREIGN PATENT DOCUMENTS

DE 19511386 C1 5/1996
DE 10046571 A1 5/2002
(Continued)

OTHER PUBLICATIONS

International Search Report of PCT/KR2015/002163—4 pages (Jun. 24, 2015).
(Continued)

*Primary Examiner* — Nick Corsaro
(74) *Attorney, Agent, or Firm* — Jefferson IP Law, LLP

(57) ABSTRACT

The present invention relates to a mobile terminal system for the remote starting and management of a vehicle, and provides a mobile terminal system for the remote starting and management of a vehicle, the system comprising: a wrist watch terminal provided in a wrist watch form, generating a response signal by being converted from an idle state into an activated state when a wake-up signal wirelessly transmitted from the outside is received, wirelessly transmitting the response signal to the outside, and performing a task for communicating with a vehicle on the basis of a real-time operating system; and a vehicle terminal provided to the vehicle, wirelessly transmitting the wake-up signal to the outside of the vehicle, receiving the response signal wirelessly transmitted from the wrist watch terminal by responding to the wake-up signal, and controlling an operation of the vehicle by analyzing the response signal.

22 Claims, 12 Drawing Sheets

(51) Int. Cl.

| | |
|---|---|
| ***B60R 25/01*** | (2013.01) |
| ***B60R 25/04*** | (2013.01) |
| ***B60R 25/20*** | (2013.01) |
| ***B60R 25/24*** | (2013.01) |
| ***G07C 9/00*** | (2020.01) |
| ***G08B 21/02*** | (2006.01) |
| ***H04W 4/60*** | (2018.01) |

(52) U.S. Cl.

CPC ..... *B60R 25/1001* (2013.01); *B60R 25/2045* (2013.01); *B60R 25/209* (2013.01); *B60R 25/24* (2013.01); *G08B 21/0205* (2013.01); *G08B 21/0272* (2013.01); *H04W 4/60* (2018.02); *B60R 2025/1013* (2013.01); *G07C 2009/00373* (2013.01)

(56) References Cited

U.S. PATENT DOCUMENTS

| | | | | |
|---|---|---|---|---|
| 8,731,155 | B2 | 5/2014 | Chesnutt et al. | |
| 8,849,499 | B2 | 9/2014 | Profitt-Brown et al. | |
| 9,251,631 | B2 | 2/2016 | Thompson et al. | |
| 10,573,093 | B2 | 2/2020 | Breed | |
| 2005/0285724 | A1 | 12/2005 | Schmidt et al. | |
| 2006/0092002 | A1* | 5/2006 | Finkelstein | B60R 25/24 340/426.19 |
| 2007/0200672 | A1 | 8/2007 | McBride et al. | |
| 2011/0043328 | A1* | 2/2011 | Bassali | G08C 17/02 340/5.71 |
| 2011/0247013 | A1 | 10/2011 | Feller et al. | |
| 2011/0275321 | A1* | 11/2011 | Zhou | H04M 1/66 455/41.2 |
| 2013/0099892 | A1 | 4/2013 | Tucker et al. | |
| 2013/0197674 | A1 | 8/2013 | Lowry | |

FOREIGN PATENT DOCUMENTS

| | | | | |
|---|---|---|---|---|
| DE | 10235132 | A1 | | 2/2004 |
| EP | 1777129 | A1 | | 4/2007 |
| EP | 2464156 | A1 | | 6/2012 |
| EP | 2703873 | B1 | | 10/2018 |
| JP | 2007-166386 | A | | 6/2007 |
| JP | 2009-002111 | A | | 1/2009 |
| JP | 2009002111 | | * | 1/2009 |
| KR | 20-0208157 | Y1 | | 12/2000 |
| KR | 2001-0083558 | A | | 9/2001 |
| KR | 2007-0092364 | A | | 9/2007 |
| KR | 2009-0089501 | A | | 8/2009 |
| KR | 10-2011-0068525 | A | | 6/2011 |
| KR | 2011-0068525 | A | | 6/2011 |
| KR | 2012-0078354 | A | | 7/2012 |
| KR | 10-2012-0116563 | A | | 10/2012 |
| KR | 2012-0116563 | A | | 10/2012 |
| KR | 10-1335344 | B1 | | 12/2013 |

OTHER PUBLICATIONS

Supplementary EP Search Report issued in EP 15788877—3 pages (Oct. 16, 2017).

Ray Chevrolet, screenshots of Youtube video "How_to_set_up_OnStar_Remote_Link_App" as of Jun. 2021, source: https://youtu.be/5Wxecqu2NU8.

VWCarNetVideoPortal, screenshot of Youtube video "Volkswagen_Car-Net™—Remote_Vehicle_Locator" as of Jun. 2021, source: https://youtu.be/2-I4QFV -z0.

VWcarnetvideoportal, screenshots of Youtube video "Volkswagen_Car-Net™—Check_Vehicle_Status" as of Jun. 2021, source: , https://youtu.be/KXg22vV1jo.

* cited by examiner

FIG. 8

| Watch ID | Data Type | Length | RSSI 1 | RSSI 2 | Checksum |
|---|---|---|---|---|---|

MOBILE DEVICE SYSTEM FOR REMOTE STARTING AND MANAGEMENT OF A VEHICLE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

The present invention disclosed herein relates to a mobile device system for remote starting and management of a vehicle, and more particularly, to a system controlling movement of a vehicle using a wrist watch device.

The present invention is derived from a part of a study from GCS: Global Creative SW of the Ministry of Trade, Industry, and Energy (project number: 201323300100, title: self-organizing software platform (SoSp) for welfare devices).

According to a widespread of smartphones and an appearance of variety of wearable devices, a new era of IoT (Internet of Things) has begun. In this machine to machine communication, providing a service only when user's position or information, or service matches is called an opportunity-based service. A user may be provided with variety of services at a certain space, or with a certain condition by using opportunity-based service through many wearable devices. To provide the opportunity-based service, ultra-low power of user's device is very important as location recognition of a user. When a location is not recognized correctly a random user may receive a service, and when a battery goes out when needed a user cannot receive a service. A traditional smart key requires user's behavior such as pushing a button of the smart key, etc. wherein the traditional smart key opens a car door by communicating with the car. Also, the traditional smart key is not helpful for a user to collect information about a car and to manage the car, because the traditional key cannot provide information relating to the car. Moreover, there is a big problem that the traditional key may be stolen from strangers.

SUMMARY OF THE INVENTION

The present invention is to provide a mobile device system for remote starting and management of a vehicle controlling operation of the vehicle such as opening a door or a trunk of vehicle with ultra-low power, or transmitting the vehicle information to a wrist watch device, etc.

Another problem to be solved by the present invention is to provide a mobile device system for remote starting and management of a vehicle providing all sorts of vehicle information to a user through communication linkage between a wrist watch device and a vehicle device, and thereby easily performing management and collecting information of the vehicle by the user.

The other problem to be solved by the present invention is to provide a comfort to a user by using a wrist watch device to automatically set a suitable vehicle environment to the user.

The other problem to be solved by the present invention is to provide a vehicle location to a user where information about the vehicle location is saved on a wrist watch device when turning off an engine of the vehicle, and thereby a user can find the vehicle easily.

The other problem to be solved by the present invention is to provide a mobile device system for remote starting and management of a vehicle performing an user authentication through speech recognition, user gesture, or Id of a wrist watch device, etc. and thereby increasing security of the vehicle.

The problems to be solved by the present invention are not limited to the above mentioned descriptions. Other unmentioned objects thereof will be understandable by those skilled in the art from the following descriptions.

A mobile device system for remote starting and management of a vehicle of the present invention in accordance with an aspect comprises: a wrist watch device provided in a wrist watch form, the wrist watch device being configured to be converted from an idle state into an activated state to generate a response signal when a wake-up signal wirelessly transmitted from the outside is received, wirelessly transmit the response signal to the outside, and execute a task for communicating with a vehicle on the basis of a real-time operating system; and a vehicle device provided in the vehicle, the vehicle device being configured to wirelessly transmit the wake-up signal to the outside of the vehicle, receive the response signal wirelessly transmitted from the wrist watch device in response to the transmitted wake-up signal, and analyze the response signal to control an operation of the vehicle.

In an embodiment, the vehicle device may transmit the wake-up signal comprising an identifying ID of the vehicle and having different pattern for each of operations of the vehicle to control different operations of the vehicle, wherein the wake-up signal has different patterns for each of the operations.

In an embodiment, the wrist watch device may comprise a received signal analysis part configured to analyze a pattern of the wake-up signal, and wherein the wrist watch device may transmit response signal corresponding to the analyzed pattern to the vehicle.

In an embodiment, the vehicle device may comprise at least one low frequency transmitter configured to transmit the wake-up signal having a frequency of 10-150 kHz and the wrist watch device may comprise at least one low frequency receiver configured to receive the wake-up signal having a frequency of 10-150 kHz.

In an embodiment, the wrist watch device may comprise a wireless communication part configured to perform wireless communication with the vehicle device, and a status converter part, the status converter part being configured to convert the wireless communication part into the activated state according to the wakeup signal, and activate a function corresponding to a pattern of the wake-up signal.

In an embodiment, the wrist watch device may comprise a received signal strength measurement part configured to measure a received signal strength of the wake-up signal, and a wrist watch control part configured to generate the response signal comprising the received signal strength. The vehicle device may comprise a response signal strength measurement part configured to measure a response signal strength of the response signal, and a vehicle control part, wherein the vehicle control part being configured to recognize a distance between the wrist watch device and the vehicle based on the received signal strength and the response signal strength, and open a door or a trunk of the vehicle or start the vehicle depending on the recognized distance.

In an embodiment, the vehicle device may transmit the wake-up signal having a predetermined pattern to transmit a vehicle information to the wrist watch device, wherein the wrist watch device may recognize a pattern of the wake-up signal to stop an executing task and a wireless communication connection with other device, and set a wireless communication connection with the vehicle device to receive the vehicle information.

In an embodiment, the wrist watch device may comprise a vehicle information management part and an alarm part, the vehicle information management part being configured to display the vehicle information on a display part, and an alarm part configured to generate an alarm depending on the vehicle information by at least one selected from a speaker and a vibration motor.

wherein the vehicle information management part displays the vehicle information on a display part, and wherein the alarm part sends an alarm through at least one of a speaker and a motor depending on the vehicle information.

In an embodiment, the vehicle information may comprise at least one selected from a door opening status, a startup status, a fuel status, a light lamp status, a tire pressure status, and a vehicle usage record.

In an embodiment, the wrist watch device may send the response signal comprising an unique ID to the vehicle device, and the vehicle device may open the door or trunk, or start the vehicle after performing an user authentication using the unique ID.

In an embodiment, the wrist watch device may further comprise at least one selected from a motion recognition part and a speech recognition part, wherein the motion recognition part is configured to recognize a predetermined user's gesture, and the speech recognition part being configured to recognize a predetermined user's speech or voiceprint. Also the wrist watch device may additionally authenticate whether a user is authenticated to the vehicle or not by at least one selected from the motion recognition part and the speech recognition part.

In an embodiment, the wrist watch device may comprise a vehicle environment setting part configured to setting a vehicle environment information corresponding to a user, and may send the vehicle environment information to the vehicle device.

In an embodiment, the vehicle environment information may comprise at least one selected from a seat, a back mirror, a side mirror, and a navigation record of the vehicle.

In an embodiment, the vehicle device may control an environment of the vehicle depending on the vehicle environment information.

In an embodiment, the vehicle device may comprise a location recognition part configured to recognize a location of the vehicle, and configured to send a location information of the vehicle to the wrist watch device when an ignition of the vehicle is switched off. The wrist watch device may comprise a vehicle parking location information provider configured to display the location information of the vehicle on a display part.

In an embodiment, the wrist watch device may save a vehicle information of each of a plurality of vehicles respectively, and may transmit the response signal to the outside to control an operation of a corresponding vehicle by using the vehicle information.

In an embodiment, the wrist watch device may remotely receive a vehicle information and a restricted time information saved in a different device to temporarily control or manage the vehicle remotely in restricted time, or remotely transmit the restricted time information and the vehicle information to the different device for the different device to remotely control or manage the vehicle temporarily in a restricted time.

According to an aspect of the present invention, a wrist watch device is provided in a wrist watch form configured to being converted from an idle state into an activated state when a wake-up signal wirelessly transmitted from a vehicle is received, to generate a response signal, wirelessly transmit the response signal to the outside, and execute a task for communicating with the vehicle on the basis of a real-time operating system.

In an embodiment, the wrist watch device may have multiple task management function, the multiple task management function comprising: receiving the wake-up signal transmitted in different patterns depending on operations from the vehicle; recognizing a pattern of the wake-up signal to stop a task communicating with another device or a task executing another work setting a wireless communication connection with a vehicle device provided in the vehicle to receive a vehicle information; and executing the stopped task.

In an embodiment, the wrist watch may comprise: a wireless communication part configured to perform a wireless communication with a vehicle device provided in the vehicle; a status converter part configured to convert the wireless communication part into an activated state depending on the wake-up signal to activate a function corresponding to a pattern of the wake-up signal; a received signal strength measurement part configured to measure a received signal strength of the wake-up signal; a wrist watch control part configured to generate the response signal comprising the received signal strength; a vehicle information management part configured to display a vehicle information, which is received from the vehicle device, on a display part; an alarm part configured to generate an alarm depending on the vehicle information by at least one selected from a vibrating motor or a speaker; and a vehicle environment setting part configured to set a vehicle environment information corresponding to a user.

According to an embodiment of the present invention, an operation of the vehicle may be controlled such as opening a door of trunk of a vehicle with ultra-low power, or transmitting vehicle information to a wrist watch device, etc.

Also, according to an embodiment of the present invention, collecting or managing a vehicle information may be easily performed by providing variety vehicle information to a user through communication connection between a wrist watch device and a vehicle device.

Also, according to an embodiment of the present invention, conformity may be provided to a user by using a wrist watch device and automatically setting a vehicle environment suitable to a user.

Also, according to an embodiment of the present invention, a user may easily find parked vehicle location by saving vehicle location information on a wrist watch device when an ignition of the vehicle is switched off.

Also, according to an embodiment of the present invention, security of vehicle may be enhanced by performing a user authentication using ID of a wrist watch device, user's gesture, speech recognition, etc.

The objects of the inventive concept are not limited to the above mentioned effects. Other objects thereof will be understandable by those skilled in the art from the present application and the following descriptions.

BRIEF DESCRIPTION OF THE DRAWINGS

FIG. 8 is a drawing exemplary showing a packet structure of a response signal transmitting from a wrist watch device to a vehicle device in accordance with an embodiment of the present invention.

DETAILED DESCRIPTION

Figure 1:
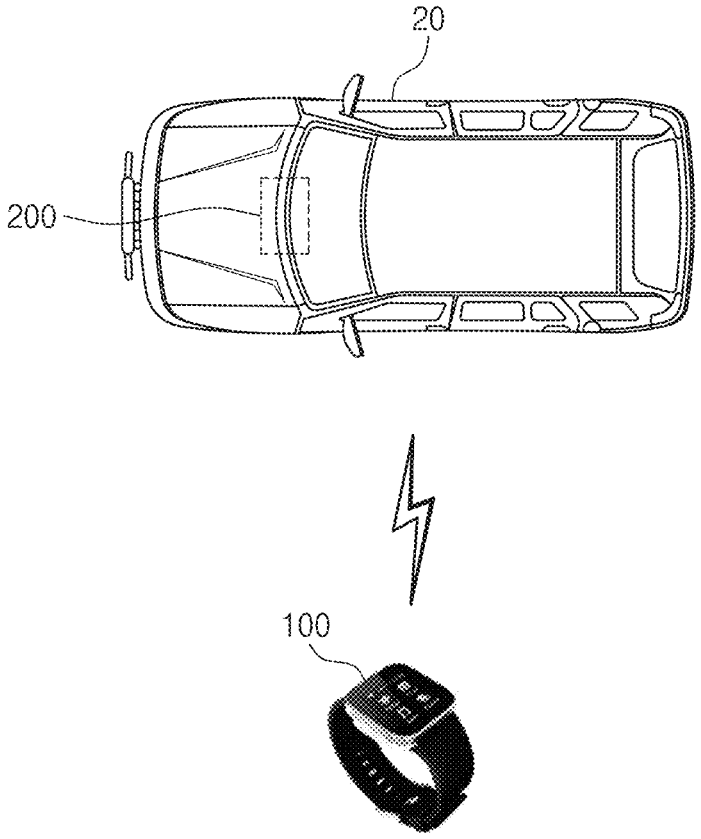
FIG. 1 is a block diagram roughly showing a mobile device system for remote starting and management of a vehicle in accordance with an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Unless otherwise defined, all terms (including technical and scientific terms) used herein have the same meaning as generally understood by those skilled in the art. The normal explanation of described composition may be omitted not to cloud the main point of the present invention. The same or corresponding objects in the drawings of the present invention may use the same reference number if possible.

Meanwhile, the terms like "~part" used in the present specification may mean a unit treating at least one of a function or an operation. For example, it may mean a hardware component such as software, FPGA, or ASIC. However, the "~part" etc. is not limited to software or hardware. The "~part" may be composed to stay in a storing medium that can be addressed, and may be composed to regenerate one of more processors.

In an example, the "~part" comprises components such as software components, object oriented software components, class components and task components, processors, functions, specifications, procedures, subroutines, segments of a program codes, drivers, firmware, microcode, circuit, data, database, data components, tables, arrays, and variables. A function provided in the "~part" may be divided into number of smaller components, or may be provided as a form combined with other "~part."

FIG. 1 is a block diagram roughly showing a mobile device system for remote starting and management of a vehicle in accordance with an embodiment of the present invention. Referring to FIG. 1, a mobile device system for remote starting and management of a vehicle 10 in accordance with an embodiment of the present invention comprises a wrist watch device 100 and a vehicle device 200. The wrist watch device 100 has portability that a user could always carry the wrist watch device in his body. The wrist watch device 100 may be provided as a smart watch like a wrist watch form that a user of a vehicle 20 may wear on his wrist. For example, the wrist watch device 100 may be provided as a form that a watch strap is equipped at the both sides of housing where the display part is installed.

The wrist watch device 100 may stand by as an idle state (inactive state) when it is far apart from the vehicle 20, and may display present date and time through the display part (for example, LCD screen) like normal wrist watch operation. The wrist watch device 100 may execute a task for communication with the vehicle device 200 on the basis of a real-time operating system when receives the wake-up signal from the vehicle device 200.

The vehicle 200 is provided to the vehicle 20 and may wirelessly transmit the wake-up signal to the outside of the vehicle 20. The wrist watch device 100 generates a response signal by being converted from an idle state into an activated state when receives the wake-up signal wirelessly transmitted from the vehicle device 200, and wirelessly transmits the generated response signal. The vehicle device 200 receives the response signal wirelessly transmitted from the wrist watch device 100, and controls an operation of the vehicle 20 by analyzing the response signal. The wrist watch device 100 may transmit the response signal comprising unique ID to the vehicle device 100 for a user authentication.

Figure 2:
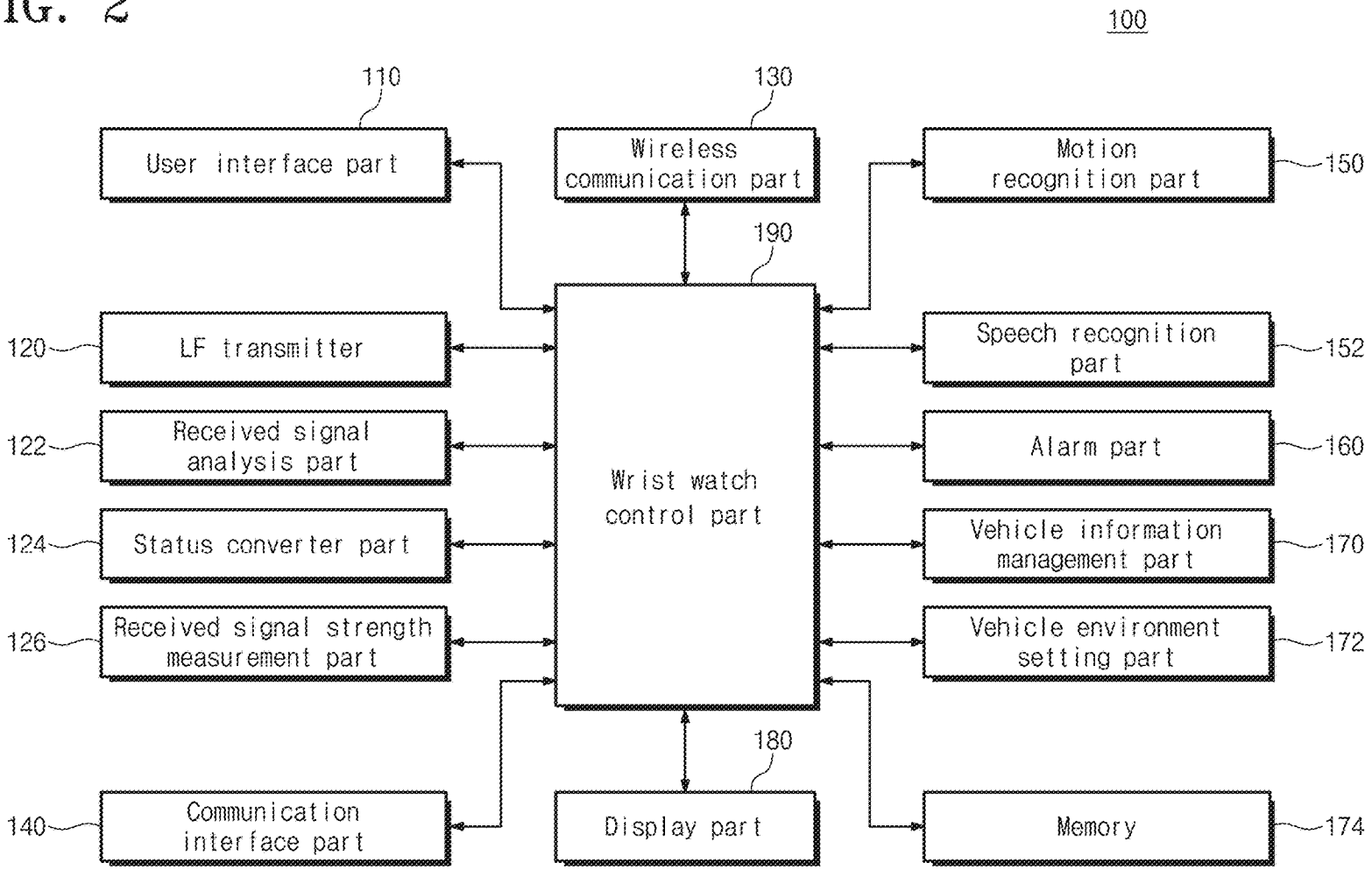
FIG. 2 is a block diagram of a wrist watch device in accordance with an embodiment of the present invention.

FIG. 2 is a block diagram of a wrist watch device in accordance with an embodiment of the present invention. Referring to the FIG. 2, the wrist watch device 100 comprises a user interface part 110, a low frequency receiver 120, a received signal analysis part 122, a status converter part 124, a received signal strength measurement part 126, a wireless communication part 130, a communication interface part 140, a motion recognition part 150, a speech recognition part 152, an alarm part 160, a vehicle information management part 170, a vehicle environment setting part 172, a memory 174, a display part 180, and a wrist watch control part 190.

The user interface part 110 may be provided for a user to check vehicle information through the display part 180, wherein the vehicle information is provided to the wrist watch device 100 from the vehicle device 200, and may be provided to insert an order such as opening a door or a trunk, etc. The user interface part 110 may be provided as one or more buttons, or may be provided as a touch pad form on the display part 180.

The low frequency receiver 120 may be provided to receive the wake up signal of 10~150 kHz frequency. The low frequency receiver 120 may be composed of a receiving coil receiving a LF (low frequency) signal. The LF signal has advantages of having a long frequency so it can pass through obstacles well, and having an ultra-low power. Therefore, by calculating a distance between the wrist watch device 100 and the vehicle 20 using the low frequency, not only a problem of low accuracy of distance recognition due to obstacles may be solved, but also a power consumption when transmitting and receiving the wake-up signal may be reduced.

The received signal analysis part 122 analyzes a pattern of the wake-up signal. In an embodiment, the vehicle device 200 may comprise an ID of the vehicle 20, and may transmit wake-up signal having different patterns for each operations to control different operations of the vehicle 20. The wrist watch device 100 may transmit the response signal responding to a pattern to the vehicle device 200 by recognizing pattern of the wake-up signal.

For example, the wake-up signal transmitting from the vehicle 200 may have '10101010 . . . ' pattern to determine an opening door status of a vehicle. The wake-up signal transmitting from the vehicle 200 may have '11001100 . . . ' pattern to determine a trunk opening status. The wake-up signal transmitting from the vehicle 200 may have '11101110 . . . ' pattern to transmit vehicle information.

The received signal analysis part 122 may perform a necessary function for performing an operation of a vehicle from the wrist watch device by analyzing the wake-up signal patterns: a door opening status, a trunk opening status, or transmitting vehicle information.

The wireless communication part 130 may be provided to perform communication wirelessly with the vehicle device 200. For example, the wireless communication part 130 may be provided as BLE (Bluetooth Low Energy) communication module. BLE communication is appropriate for providing an opportunity-based service because it has low power consumption, fast paring, and supports message transmit. For example, when an ignition of the vehicle is switched off after driving, variety vehicle usage record may be collected from the vehicle device 200 using a RF communication. Also, statistics, analysis, and vehicle management of an information relating to a vehicle may be performed by transmitting the variety vehicle information collected from the wrist watch device 100 to the outside device (for example, smart phone, smart pad, computer, etc.) through the wireless communication part 130, and thereby checking the information though the outside device.

The status converter part 124 converts the wireless communication part 130 into an activated state (wake-up mode), and activates a corresponding function to a pattern of the wake-up signal analyzed in the received signal analysis part 122 depending on the wake-up signal. For example, when the wake-up signal is transmitted to determine whether open a door or a trunk of a vehicle, the status converter part 124 activates the received signal strength measurement part 126 in an idle state (sleep mode), and converts the wireless communication part 130 into an activated state to transmit the response signal comprising the measured received signal strength.

In another example, when the wake-up signal is received to transmit vehicle information, the status converter part 124 activates the vehicle information management part 170 from an idle state (inactive mode), and converts the wireless communication part 130 into an activated state to receive an advertisement message to set a communication connection with the vehicle device 200. Therefore, the wrist watch device 100 has an advantage of a lower power operation, because the wrist watch device 100 stands by in an idle state and wakes a communication module to operate only when it receives the wake-up signal (for example, LF signal).

The received signal strength measurement part 126 measures a RSSI (Received Signal Strength Intensity) of the wake-up signal. The received signal strength measurement part 126 may measure the RSSI of the wake-up signal respectively to determine door and trunk of a vehicle opening status.

The communication interface part 140 may be provided for communication connection with operation of variety module, charger, or outside devices. For example, the communication interface part 140 may be provided as a protocol such as I2C (Inter-Integrated Circuit bus), SPI (Serial Peripheral Interface), UART (Universal Asynchronous Receiver/Transmitter), or GPIO (General Purpose Input/Output).

The motion recognition part 150 and the speech recognition part 152 may be provided for additional authentication of a user. The motion recognition part 150 may recognize predefined user's motion (gesture) by analyzing measured values of a gyro sensor and an acceleration sensor, etc. The speech recognition part 152 may be provided to recognize predefined user's voice or voiceprint. When a person speaks a voice passes through the voiceprint of his throat, and thereby having his own waveform. The speech recognition part 152 analyzes these voiceprints and recognizes waveforms of the voice and may recognize a particular user. The speech recognition part 152 may comprise a microphone, a codec, and an algorithm for voiceprint analysis, etc. For example, opening a door of a vehicle, controlling starting, and etc. may be performed after checking the vehicle ID, and going through an additional recognition process whether a user is registered for the vehicle through the motion recognition part 150 or the speech recognition part 152.

The motion recognition part 150 and the speech recognition part 152 may be used to perform an additional recognition process to prevent stealing or to prevent others, children, and etc. using a vehicle. Besides, the motion recognition part 150 and the speech recognition part 152 may be used as a user interface to perform particular functions such as opening a trunk, controlling the volume of music, turning on a/c of a vehicle without user's inconvenience and complexity, and etc.

The alarm part 160 may generate an alarm through at least one of a vibrating motor and a speaker depending on a vehicle information received from the vehicle device 200. The vehicle information may comprise a vehicle status such as a door opening status, a starting status, a fuel status, a light lamp status, a tire pressure status, and etc., a vehicle usage record, a vehicle maintenance date, and etc. The alarm part 160 alerts a user by generating a vibration or a sound when the wrist watch device 100 is certain distance apart from the vehicle 20 with the vehicle door open or when there is a problem with the vehicle.

The vehicle information management part 170 performs a function collecting, managing, and displaying the vehicle information received from the vehicle device 200 through the display part 180. For example, the vehicle information management part 170 may provide variety of information such as vehicle driving path, driving distance, fuel consumption, average driving speed, driving hour, gas refuel period, engine oil replacement period, and etc. Besides, the vehicle information management part 170 may provide a comfort for a user to easily manage a vehicle by providing information such as if a user has a habit of decreasing fuel efficiency, when to receive AS, and etc.

The vehicle environment setting part 172 sets vehicle environment information corresponding to a user. The vehicle environment information is transmitted to the vehicle device 200 for a vehicle environment to be adjusted corresponding to a user. For example, the vehicle environment information may comprise information such as a vehicle seat, a back mirror, a side mirror, a navigation record, and etc.

The memory 174 may save necessary information such as a program, vehicle information, a vehicle environment setting information, and etc. to perform functions of the wrist watch device 100. The display part 180 may be provided to display the vehicle information. For example, the display part 180 may be provided as a LCD (Liquid Crystal Display) screen.

The wrist watch control part 190 may perform a function such as creating an advertisement message for wireless communication with the vehicle device 200, creating the response signal comprising RSSI of the wake-up signal, and etc. to figure out the vehicle 20 location of a user. The wrist watch control part 190 may have modules of RTOS (Real-Time Operation System) and RCT (Real-Time Clock), and may comprise one or more of processor, and a memory.

Other than described above, the wrist watch device 100 may comprise a vehicle parking location information provider locating a vehicle location information through the display part 180. For example, the vehicle location information may be transmitted to the wrist watch device 100 from the vehicle device 200 when an ignition of the vehicle is switched off.

Figure 3:
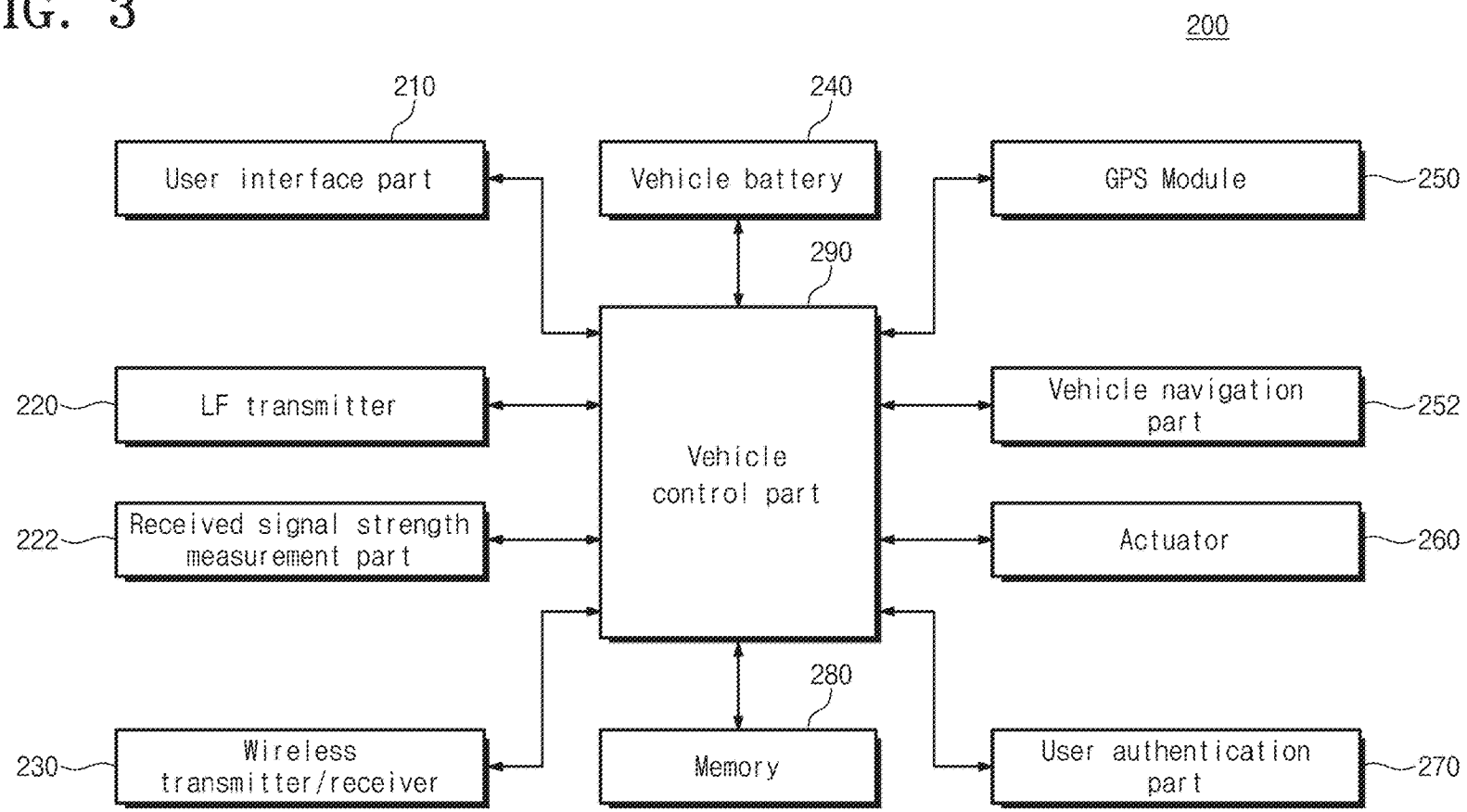
FIG. 3 is a block diagram a vehicle device composing a mobile device system for remote starting and management of a vehicle in accordance with an embodiment of the present invention.

FIG. 3 is a block diagram a vehicle device composing a mobile device system for remote starting and management of a vehicle in accordance with an embodiment of the present invention. Referring to the FIG. 3, the vehicle device 200 comprises a vehicle interface part 210, a LF transmitter 220, a received signal strength measurement part 222, a wireless transmitter and receiver 230, a vehicle battery 240, a location measurement module 250, a vehicle navigation part 252, an actuator 260, a user authentication part 270, a memory 280, and a vehicle control part 290.

The vehicle interface part 210 may be provided to use when a user (driver) starts a vehicle. For example, the vehicle interface part 210 may be provided as a button form for a user to start the vehicle. When the user enters an order to start the vehicle through the vehicle interface part 210, the vehicle device 200 wakes the wrist watch device 100 by receiving the wake-up signal to the wrist watch device 100. After that, the vehicle device 200 recognizes a location of the wrist watch device 100 from the signal transmitted from the wrist watch device 100, and authenticates the user and starts the vehicle.

The low frequency transmitter 220 may be provided to transmit the wake up signal having a frequency of 10~150 kHz. The low frequency transmitter 220 may be composed of a receiving coil receiving a LF (low frequency) signal. The LF signal has advantages of having a long frequency so it can pass through obstacles well, and having an ultra-low power. Therefore, by calculating a distance between the wrist watch device 100 and the vehicle device 200 using the low frequency, not only a problem of low accuracy of distance recognition due to obstacles may be solved, but also a power consumption when transmitting and receiving the wake-up signal may be reduced. The low frequency transmitter 220 may be installed on a plurality number of locations inside the vehicle. In an embodiment, the low frequency transmitter 220 may be installed in the center of the vehicle and in a trunk, and it may also be installed on a door handle, and etc.

The received signal strength measurement part 222 measures a response signal strength of the response signal transmitted from the wrist watch device 100 by responding to the wake-up signal. The response signal comprises information of a received signal strength measured in the wrist watch device 100 to the wake-up signal transmitted from the vehicle device 200. The vehicle control part 290 may recognize a distance between the wrist watch device 100 and the vehicle device 200, based on the response signal strength measured from the response signal and the received signal strength included in the response signal received from the wrist watch device 100. Also, it may start the vehicle or open a door or trunk based on the distance. For example, the vehicle device 200 may perform an operation such as opening or closing the vehicle door, or starting the vehicle by correctly recognizing a distance between the vehicle and the user, depending on the 10~150 kHz LF signal and a distance recognition method using the BLE communication.

The wireless transmitter and receiver 230 may be provided to perform two way wireless communications with the wrist watch device 100. For example, the transmitter and receiver 230 may be provided as a BLE (Bluetooth Low Energy) communication module. The BLE communication is appropriate for providing an opportunity-based service because it has low power consumption, fast paring, and supports message transmit. Alternatively, the wireless transmitter and receiver 230 of the vehicle device 200, and the wireless communication part 130 of the wrist watch device 100 may be provided as another communication module not the BLE communication module such as UHF (Ultra-High Frequency) communication module, and etc. Also, it may be provided with the BLE communication module comprising UHF and another communication module at the same time.

The location measurement module 250 may be provided to recognize a vehicle location. For example, the location measurement module 250 may be provided as GPS (Global Positioning System) module. The vehicle control part 290 may transmit the vehicle location information to the wrist watch device 100 when an ignition of the vehicle is switched off. Meanwhile, it is possible to locate a vehicle parking location through location information such as tag signal installed in a particular node, and etc.

The vehicle navigation part 252 may record variety information like user's vehicle driving record, such as, vehicle driving hour, a driving path, a parked hours, and etc. The vehicle control part 290 may transmit a predetermined pattern of the wake-up signal to transmit the vehicle information such as the vehicle driving record, and etc. to the wrist watch device 100. The wrist watch device 100 may have multiple task management function comprising: stopping a task communicating with another device or a task executing another work by recognizing a pattern of the wake-up signal; receiving a vehicle information by setting a wireless communication connection with the vehicle device 200; and then restoring a stopped task.

The actuator 260 may control a vehicle environment depending on the vehicle environment information corresponding to the ID of the wrist watch device 100. For example, the actuator 260 may be automatically adjusted properly to the user's vehicle environment information setting such as seat, back mirror, side mirror height, front and back position, angle, and etc.

The user authentication part 270 may determine authentic user by user's authentication information transmitted from the wrist watch device 100, such as identifying the ID transmitted from the wrist watch device 100. That is, the wrist watch device 100 has an authentic unique ID to identify whether a user is appropriate to drive the vehicle or not. Therefore, the vehicle device 200 may open a door or a trunk of the vehicle without using the key, but by performing the user authentication using authentic information such as ID of the wrist watch device 100. Also, it may perform operations such as starting the vehicle, and etc. just by pressing a button possessed in the vehicle.

The user authentication part 270 may determine whether a user is authentic user or not other than using the ID of the wrist watch device 100. The other methods is matching an additional authentic information, such as voice, motion, or passcode, and etc. transmitted through the wrist watch device 100 as entered, to the predetermined voice, motion, or passcode, and etc. corresponding to the user. Therefore, performing the additional authentication like above, the wrist watch device 100 may prevent problems like robbery, stealing, and etc. according to another embodiment of the present invention, the user authentication part 270 may be provided in the wrist watch device 100.

The memory 280 remembers a necessary program to perform variety functions of the vehicle device 200. The vehicle battery 240 provides a power supply to operate the vehicle device 200.

Figure 4:
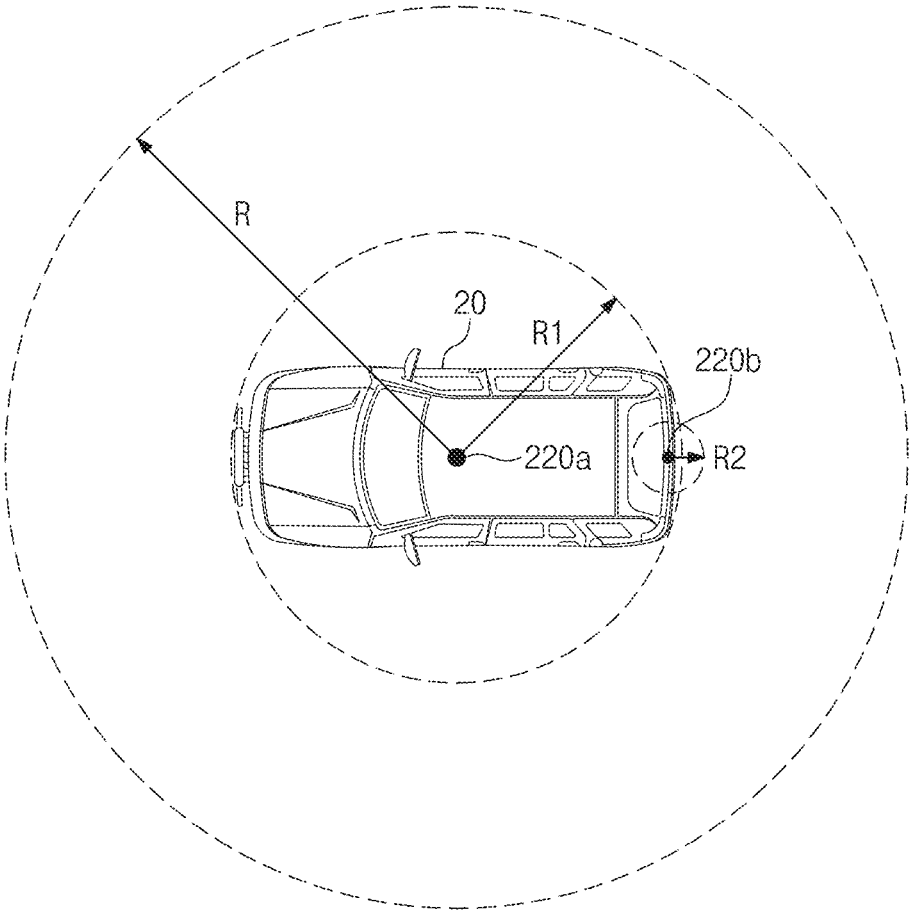
FIG. 4 is a drawing of a transmitting boundary of a low frequency transmitter composing a mobile device system for remote starting and management of a vehicle in accordance with an embodiment of the present invention.

FIG. 4 is a drawing of a transmitting boundary of a low frequency transmitter composing a mobile device system for remote starting and management of a vehicle in accordance with an embodiment of the present invention. In a described embodiment of the FIG. 4, the LF transmitters 220a and 220b are installed in the center of the vehicle and a trunk respectively. A first LF transmitter 220a installed in the center of the vehicle, transmits the LF signal as the wake-up signal at certain period of time. A transmit radius of the first LF transmitter 220a is marked as 'R'. When a user approaches close to the vehicle and is within the radius 'R1', the vehicle device 200 determines that the user is willing to open the vehicle door, and unlocks a locking device as possible to open the vehicle door.

The second LF transmitter 220b installed in the trunk transmits the LF signal that is different pattern from the first LF transmitter 220a as the wake-up signal to perform trunk opening function. A transmit radius of the second LF transmitter 220b is marked as 'R2'. When the wrist watch device 100 stays for a certain time in the radius 'R2', the vehicle device 200 determines that the user is willing to open the vehicle trunk and opens the trunk automatically. This function is helpful when a user's hands are full holding heavy objects.

Figure 5:
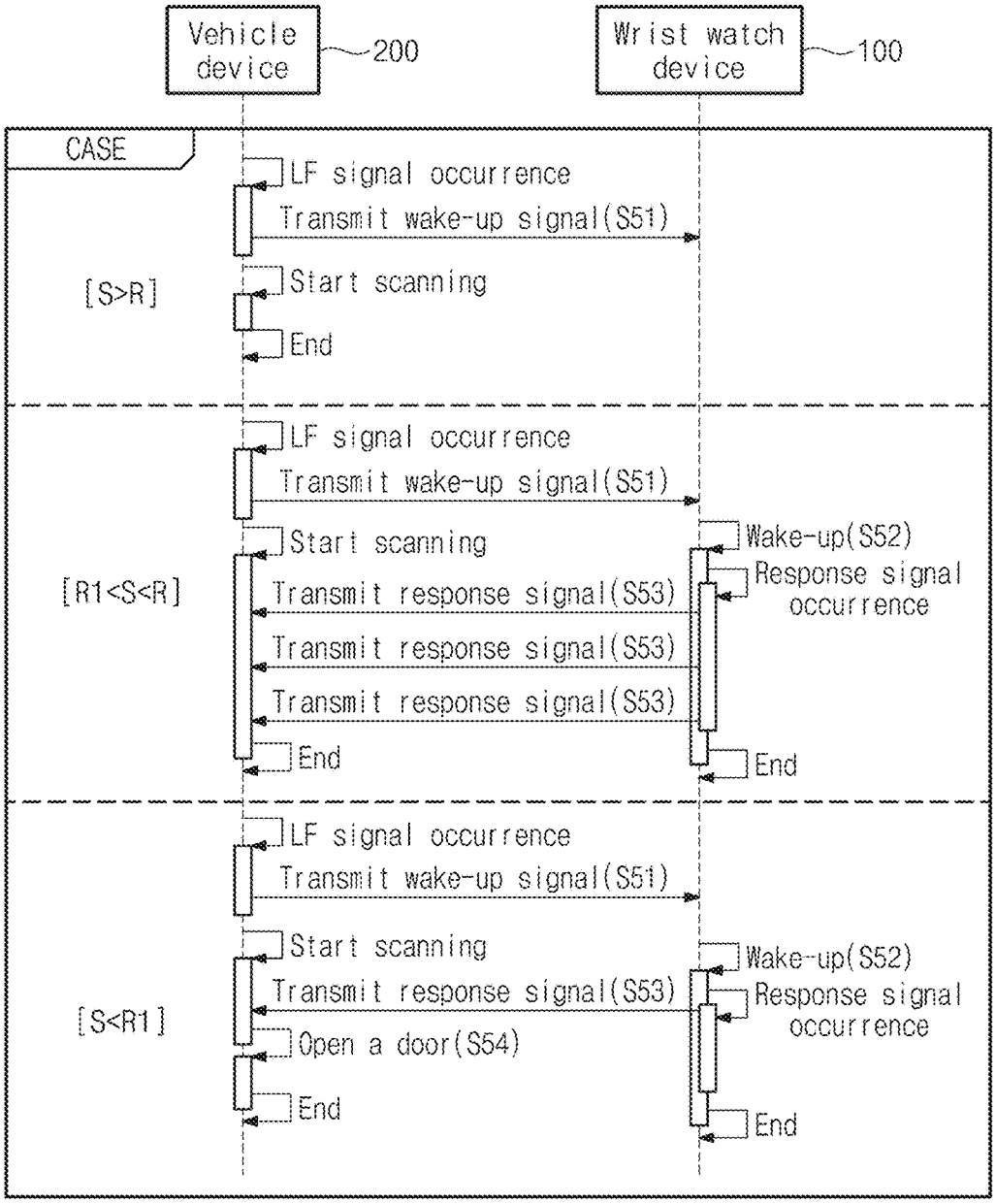
FIG. 5 is a flow chart exemplary showing a process of opening a vehicle door by a mobile device system for remote starting and management of a vehicle in accordance with an embodiment of the present invention.

FIG. 5 is a flow chart exemplary showing a process of opening a vehicle door by a mobile device system for remote starting and management of a vehicle in accordance with an embodiment of the present invention. Referring to FIGS. 4 and 5, the first LF transmitter 220a installed in the center of the vehicle transmits a wake-up signal S51 generating the LF signal at a certain period of time. In a case '[S>R]', where the wrist watch device 100 places outside of the transmit radius R of the first LF transmitter 220a, the vehicle device 200 stops scanning without generating any event because the response signal is not transmitted to the vehicle device 200.

If a user wearing the wrist watch device 100 is within the transmit radius R of the first LF transmitter 220a '[R1<S<R]', the wrist watch device 100 wakes up by the LF signal and transmits its own ID and the response signal S52, S53 to the vehicle device 200 through BLE communication, wherein the response signal comprises RSSI value measured for LF signal. At this time, the vehicle device 200 measures a distance between the vehicle and the wrist watch device 100 using the response signal strength of the response signal and the RSSI of the response signal received from the wrist watch device 100.

If the wrist watch device 100 is outside of the R1 that could open a vehicle door, the vehicle door does not open. If the wrist watch device 100 is within the 'R1' '[S<R1]', the vehicle device 200 unlocks the locking device for a vehicle door to be opened S54 after checking the ID of the wrist watch device 100. When the locking device unlocks, a user may open the vehicle door by pulling a handle of pushing a button of the handle.

Figure 6:
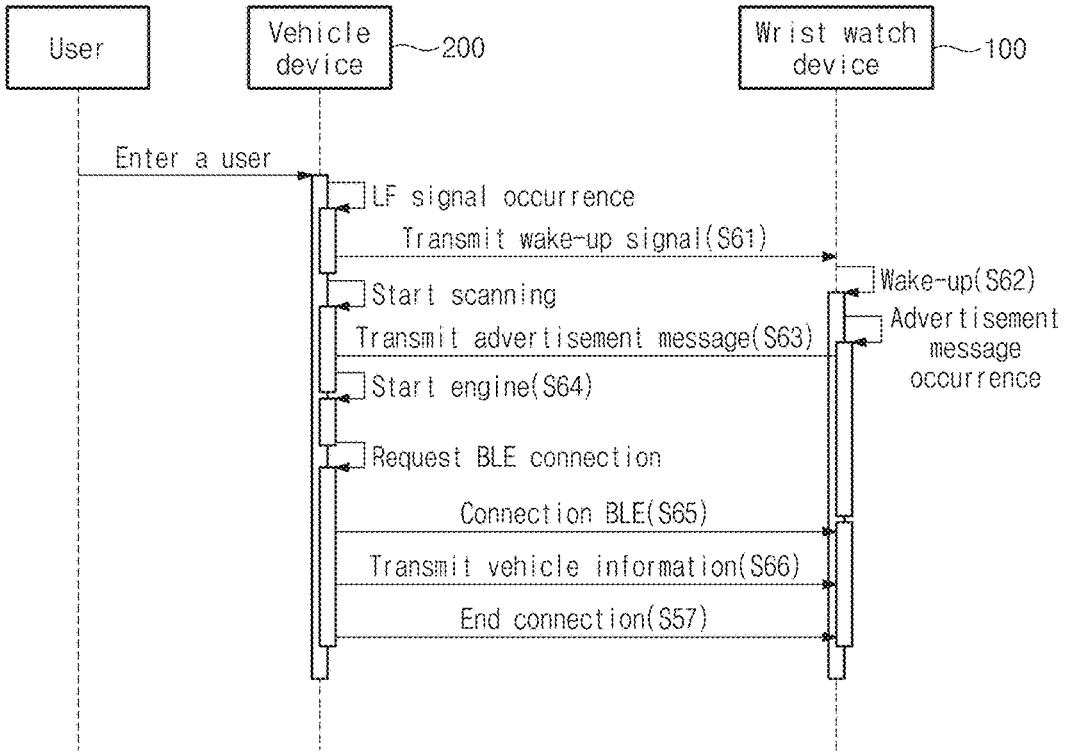
FIG. 6 is a flow chart exemplary showing a process of starting a vehicle by a mobile device system for remote starting and management of a vehicle in accordance with an embodiment of the present invention.

FIG. 6 is a flow chart exemplary showing a process of starting a vehicle by a mobile device system for remote starting and management of a vehicle in accordance with an embodiment of the present invention. Through the described process of the FIG. 5, when a user opens the vehicle door and gets on the vehicle, the vehicle device 200 uses the both RSSI value of the LF signal and the RSSI value of the RF signal and figures the correct location of the wrist watch device 100, and then determines if the wrist watch device 100 has boarded on the vehicle driver seat or not. For example, the vehicle device 200 may measure a distance between the wrist watch device 100 and the vehicle device 200 by calculating an average value of a first distance of the wrist watch device 100 estimated from the RSSI value of the RF signal and a second distance of the wrist watch device 100 estimated from the RSSI value of the LF signal. When a user in on the driver seat of the vehicle and pushes starting button of the vehicle, a variety data is exchanged by performing the BLE connection among the wrist device 100, the vehicle device 200, and the user authentication to start the vehicle.

Referring to the FIG. 6, when a user pushes the vehicle starting button, the wake-up signal is transmitted S61 from the vehicle device 200 to the wrist watch device 100. The wake-up signal wakes the wrist watch device 100 in an idle state and operates the communication module, and transmits an advertisement message S62, S63 comprising the wrist watch device 100 ID. The vehicle device 200 received the advertisement message starts the engine S64 after finishing the ID authentication, request for the BLE connection S65, and then transmits the variety of vehicle information S66 to the wrist watch device 100. Meanwhile, the vehicle device 200 may start the vehicle or transmit the vehicle information after performing additional authentication such as entering a passcode, recognizing a gesture of a voice, and etc. other than user ID authentication.

FIGS. 7a to 7d are drawings exemplary showing a display part composing a wrist watch device and a user interface part in accordance with an embodiment of the present invention. Referring to the FIG. 7a, the wrist watch device 100 displays the present time and date through the display part 180 while standing by an idle (inactive) state.

Figure 7A:
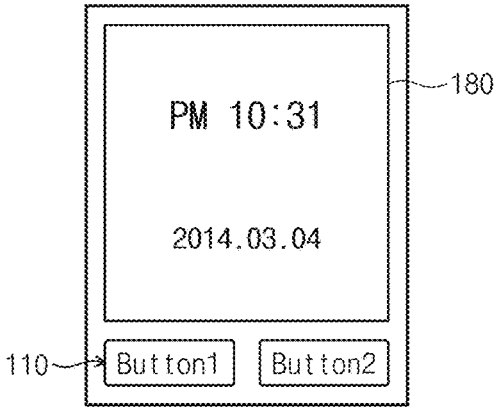
FIGS. 7a to 7d are drawings exemplary showing a display part composing a wrist watch device and a user interface part in accordance with an embodiment of the present invention.
Figure 7B:
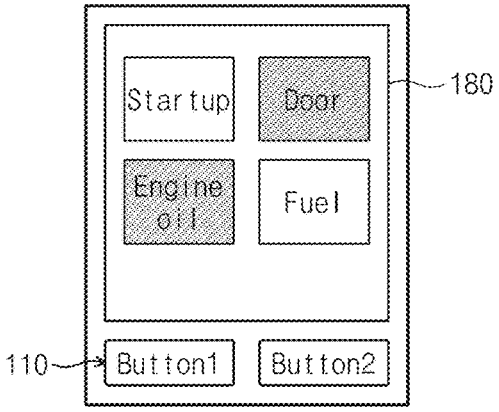
Figure 7C:
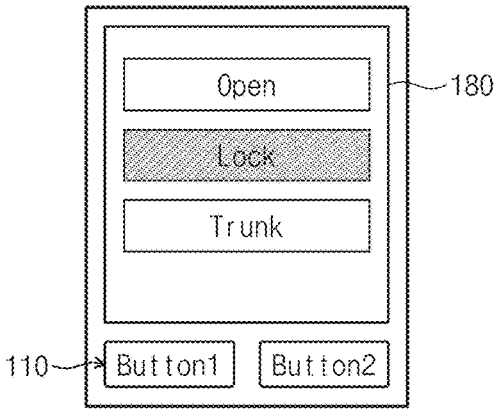

As described in the FIG. 7b, when a user gets on a vehicle, the wrist watch device 100 may display the vehicle information provided from the vehicle device 200 through the display part 180. For example, the wrist watch device 100 indicates information such as starting status, door opening status, fuel (oil) or engine oil fulfill status, and etc. as shade or color for a user to easily recognize.

A user may enter an order in the user interface part 110 to perform a necessary function such as selecting a menu by using a two physical buttons. For example, the user may open a trunk or open and close the vehicle door remotely by selecting a sections like 'open', 'close', and 'trunk' at the screen of the display part 180 described in the FIG. 7c.

Figure 7D:
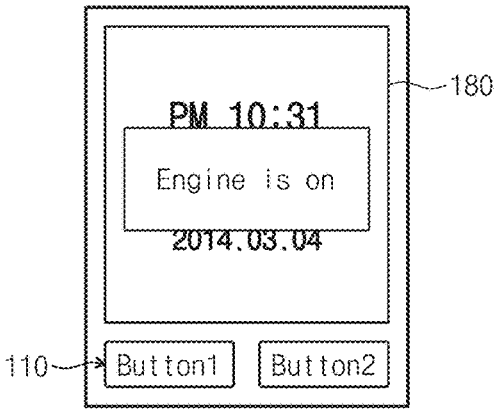

If a user is certain distance apart while an ignition of the vehicle is switched on, the wrist watch 100 like described in the FIG. 7d may display an alert message such as 'the engine is on'! in the display part 180, and notice the user through vibration or an alert sound.

FIG. 8 is a drawing exemplary showing a packet structure of a response signal transmitting from a wrist watch device to a vehicle device in accordance with an embodiment of the present invention. Referring to the FIG. 8, the wrist watch device 100 converts into an active state depending on the wake-up signal transmitting from the vehicle device 200 while getting closer to a vehicle. the wrist watch device 100 transmits the response signal including a watch ID, data type, data length, RSSI1 and RSSI2 measured to the wake-up signal, and error checksum.

At this time, the 'RSSI1' is a received signal strength intensity measured for the LF signal transmitted from the first LF transmitter 220a installed in the center of the vehicle, and is used to determine the door opening status. The 'RSSI2' is a received signal strength intensity measured for the LF signal transmitted from the first LF transmitter 220a installed in vehicle trunk, and is used to determine the trunk opening status.

When there is a need to note a dangerous situation or give a warning to a user while driving, a user should do things like: disconnecting a connection between the user's wrist watch device 100 and a smart phone, when the user's wrist watch device 100 and the smart phone is connected by Bluetooth; and connecting a communication connection between the wrist watch device 100 and the vehicle device 200. At this time, the connection between the wrist watch device 100 and the smart phone may be disconnected by interrupting the wrist watch device 100 using the LF signal of the vehicle.

Figure 9:
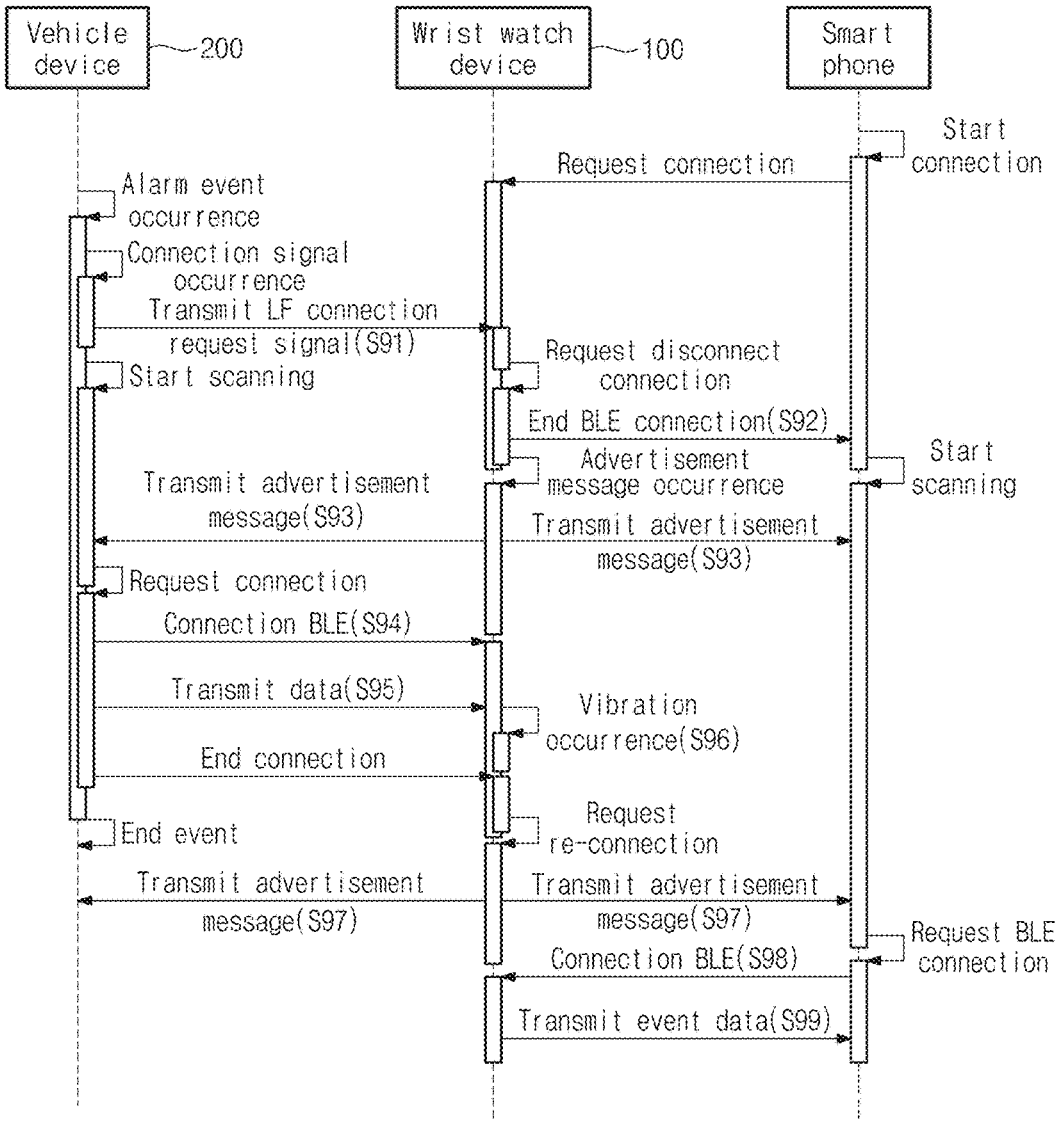
FIG. 9 is a flow chart exemplary showing a process of setting a communication between a wrist watch device and a vehicle device while driving by a mobile device system for remote starting and management of a vehicle in accordance with an embodiment of the present invention.

FIG. 9 is a flow chart exemplary showing a process of setting a communication between a wrist watch device and a vehicle device while driving by a mobile device system for remote starting and management of a vehicle in accordance with an embodiment of the present invention. Referring to the FIG. 9, to transmit a vehicle information such as deficiency of a fuel, tire pressure problem, and etc. while driving to the wrist watch device 100, the vehicle device 200 generates an alarm event, and transmits a LF signal S91 to the wrist watch device 100, wherein the LF signal is to request a connection using the LF transmitter.

Then, the wrist watch device 100 disconnects connection between the BLE S92 and the smartphone as interrupt happens depending on the LF signal, and transmits BLE MAC ID of the vehicle S93 to surroundings including the advertisement message. The wrist watch device 100 request for the BLE connection to the wrist watch device 100 after receiving the advertisement message, and disconnects the connection S94, S95 after transmitting a data (vehicle information). The wrist watch device 100 notes a dangerous situation or gives an warning to a user S96 by generating a vibration, an alert sound, and etc. by transmitting the data from the vehicle device 200. After that, the wrist watch device 100 transmits the advertisement message to reconnect with the smart phone, and collects information through BLE connection S97~S99 by responding to an BLE connection from the smartphone and transmitting an event information to the smartphone.

Figure 10:
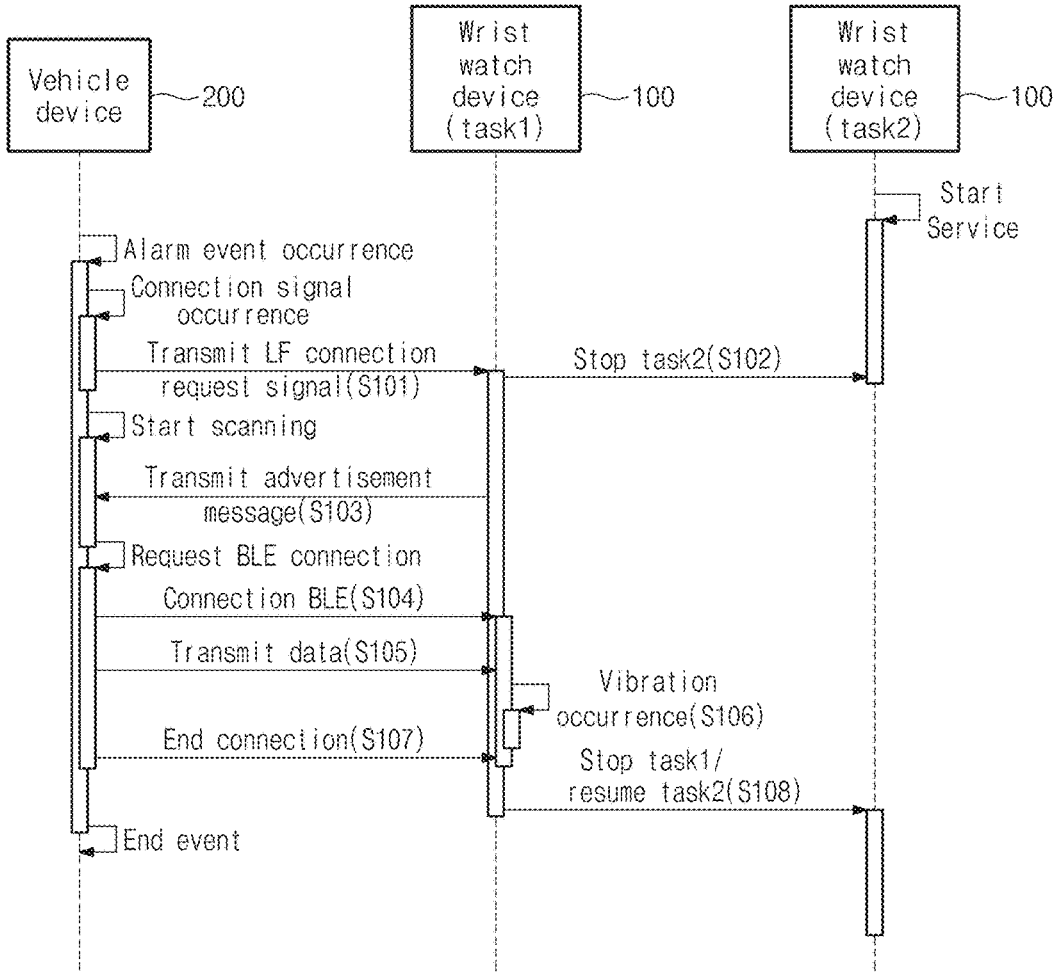
FIG. 10 is a flow chart exemplary showing a process of setting a communication between a wrist watch device and a vehicle device while executing a task of a wrist watch device by a mobile device system for remote starting and management of a vehicle in accordance with an embodiment of the present invention.

FIG. 10 is a flow chart exemplary showing a process of setting a communication between a wrist watch device and a vehicle device while executing a task of a wrist watch device by a mobile device system for remote starting and management of a vehicle in accordance with an embodiment of the present invention. Referring to the FIG. 10, to transmit a vehicle information such as fuel deficiency, tire pressure problem, and etc. to the wrist watch device 100, the vehicle device 200 transmits the LF signal S101 to the wrist watch device 100 generating the alarm event, wherein the LF signal requests for a connection using the LF transmitter.

When the wrist watch device 100 receives a higher priority task than the task executing in the present from the vehicle device 200, it stops the present task and executes the new task S102. That is, when there is a need to send an alarm to a user urgently, an existing task may be stopped by interrupting the wrist watch device 100 using the LF signal, and a task treating communication between the wrist watch device 100 and the vehicle device 200 may be performed preferentially.

A series of process S103~S107, transmitting a data (vehicle information) by setting a communication between the wrist watch device 100 and the vehicle device 200, generating an alarm, and then disconnecting the connection is similar to a process of the FIG. 9 S93~S96, so a detailed explanation is omitted. When the communication between the wrist watch device 100 and the vehicle device 200 ends, an existing task is executed (resumed) S108.

Figure 11:
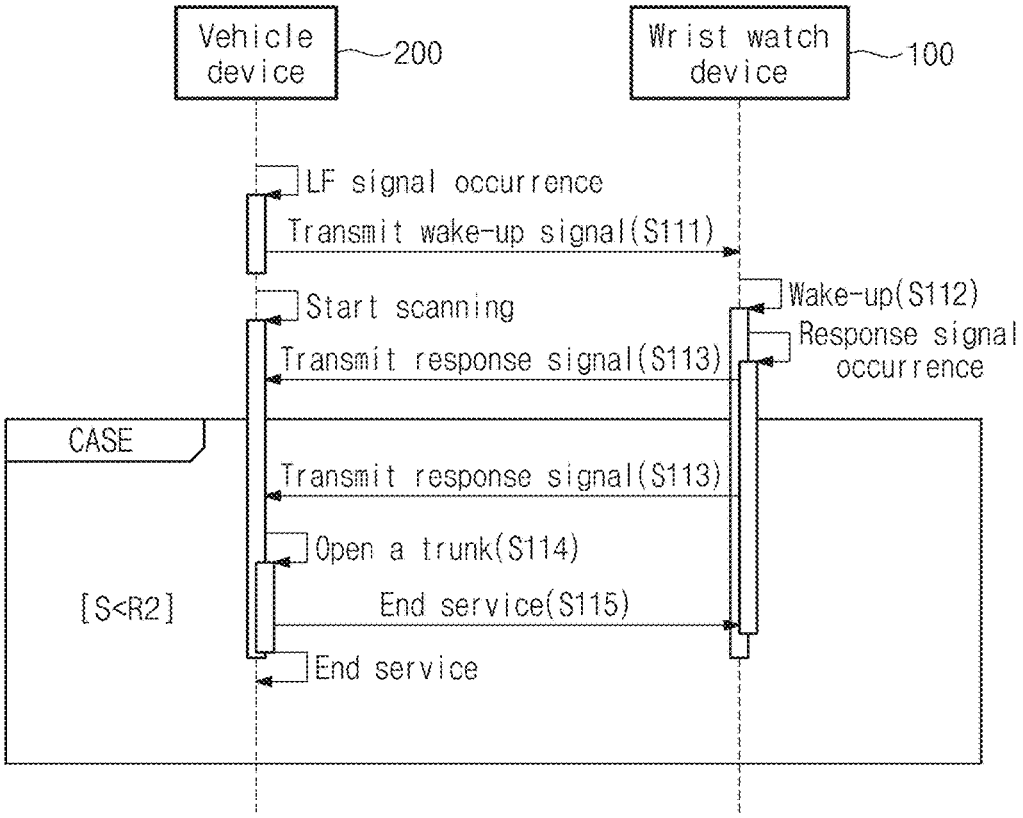
FIG. 11 is a flow chart exemplary showing a process of opening a vehicle trunk by a mobile device system for remote starting and management of a vehicle in accordance with an embodiment of the present invention.

FIG. 11 is a flow chart exemplary showing a process of opening a vehicle trunk by a mobile device system for remote starting and management of a vehicle in accordance with an embodiment of the present invention. Referring to the FIGS. 4 and 11, the second LF transmitter 220b installed in a trunk transmits the wake-up signal S111 generating the LF signal at a certain period of time. When the wrist watch device 100 locates outside of the transmit radius R2 of the second transmitter 220b, the vehicle device 200 does not generate any event and stops scanning because it does not receive the response signal.

If a user wearing the wrist watch device 100 is within the transmit radius R2 of the second LF transmitter 220b '[S<R2]', the wrist watch device 100 wakes up by the LF signal and transmits its own ID and the response signal S112, S113 to the vehicle device 200 through the BLE communication, wherein the response signal comprises RSSI value measured for LF signal.

The vehicle device 200 measures a distance between the trunk and the wrist watch device 100 using the response signal strength of the response signal received from the wrist watch device 100. If the wrist watch device 100 is within the radius 'R2', the vehicle device 200 checks the ID of the wrist watch device 100, opens the trunk, and shuts down the service S114, S115. This function is helpful when a user's hands are full holding heavy objects.

Figure 12:
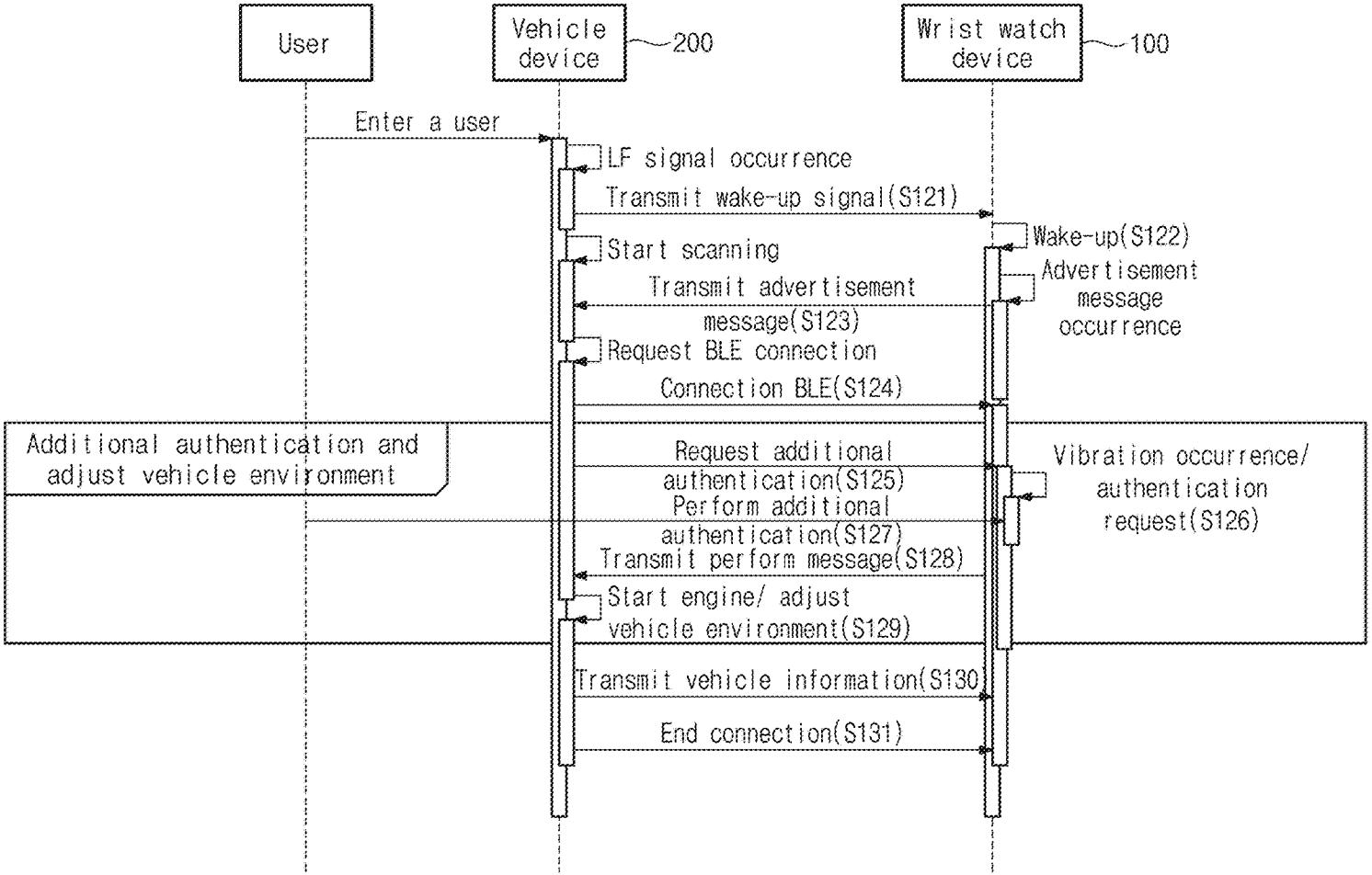
FIG. 12 is a flow chart exemplary showing a process of setting a vehicle environment by a mobile device system for remote starting and management of a vehicle in accordance with an embodiment of the present invention.

FIG. 12 is a flow chart exemplary showing a process of setting a vehicle environment by a mobile device system for remote starting and management of a vehicle in accordance with an embodiment of the present invention. Referring to the FIG. 12, when a user pushes the vehicle starting button, the wake-up signal is transmitted S121 from the LF transmitter of the vehicle device 200. When the wake-up signal is received to the wrist watch device 100, the wrist watch device 100 wakes up from a sleep state, and tries to make the BLE connection with the vehicle device 200 by transmitting the advertisement message S122, S123, S124.

When the BLE is connected, the vehicle device 200 requests an additional authentication S125 to the wrist watch device 100, and the wrist watch device 100 notice a user through the display part or a speaker, etc. that the additional authentication is needed. Since then, when a user performs an additional authentication S127 by inserting a passcode, gesture recognition or voiceprint (voice) recognition, and so on, a permission message indicating that the additional authentication is done is sent to the vehicle device 200. After the vehicle device 200 checks the permission message and starts a vehicle, it changes the vehicle setting S129 such as seat, back mirror, side mirror, and so on to the vehicle environment setting value that fits to the user. After that, the vehicle device 200 transmits variety of vehicle information S130 to the wrist watch device 100 and performs disconnecting a connection S131 for lifelogging.

For example, the vehicle environment setting vale of the user may be set in a way to transmit vehicle environment information, which was previously set, from the vehicle device 200 to the wrist watch device 100, after the user gets on the vehicle and sets the seat, back mirror, side mirror, and etc. in a desirable environment. When a plurality of users uses the same vehicle alternatively, they may be provided with convenience as the vehicle environment can automatically adjusted by the user's setting after checking through a user ID.

In an embodiment, the wrist watch device 100 may save vehicle information of several numbers of vehicles respectively, and may transmit response signal to control corresponding vehicle operation by using the above vehicle information. Therefore, a user possessing a plurality of vehicles may control several vehicles with one wrist watch device 100 by performing functions described in advance, such as opening a door, starting a vehicle, managing a vehicle, setting a vehicle environment of several numbers of vehicles, or etc.

In an another embodiment, the wrist watch device 100 receives vehicle information saved in another device (not described) with restricted time information and may temporary control the vehicle remotely (door open, starting vehicle, management, set vehicle environment, and etc.) in a restricted time. Also, it may remotely transmit vehicle information with restricted time information to another device for another device to temporary control the vehicle remotely in a restricted time. The vehicle information may comprise a user ID (or a vehicle ID) who could drive the vehicle, other authentication information (gesture, voiceprint information), and etc.

That is, as entering smart key information of a vehicle, which is saved in the wrist watch device or in other particular device, in another wrist watch device remotely and transmitting it may give an authority to use the vehicle in restricted time after coping the smart key information to the another wrist watch device. These functions may be used lending a vehicle to others or in rental car. At this time, a vehicle may be rented to use at a certain restricted time by making a vehicle operation impossible of using the wrist watch device when the restricted time exceeds.

The mobile system for remote starting and management of a vehicle described above in accordance with an embodiment of the present invention may open door or a trunk of the vehicle with ultra-low power, may control a vehicle operation like transmitting vehicle information to the wrist watch device, and etc., and provide convenience to a user by lengthening charge period and operation hours of the wrist watch device.

Also, The mobile system for remote starting and management of a vehicle in accordance with an embodiment of the present invention may provide fast paring and fast message transmit between the wrist watch device and the vehicle device. According to an embodiment of the present invention, a user may conveniently check vehicle information by transmitting variety of vehicle information to the wrist watch device, and collect and manage the vehicle information easily. Also, the present invention may help the user to easily recognize variety of dangerous situations or unexpected situations by generating a vibration or a sound through the wrist watch device while driving or not.

Also, according to an embodiment, a vehicle setting may automatically change depending on a user when starting the vehicle by saving vehicle environments appropriate for each user in the wrist watch device. That is, When a user gets permission for using other vehicle like rental car and gets user authentication, the user may be provided with convenience by recalling his personal settings from a memory of the wrist watch device and apply to the new vehicle.

Also, according to an embodiment, it is possible to transmit vehicle location information and remember the parked vehicle location when turning off the vehicle engine. Also, it is possible for the user to easily find parking location of the vehicle by knowing the vehicle location saved in the wrist watch device through a smart phone, and so on.

Foregoing embodiments are provided to help understanding of the inventive concept, but do not limit the scope of the inventive concept, and thus will be understood that the inventive concept can be carried out in other specific forms without changing the technical idea or essential features. Therefore, the technical scope of protection of the inventive concept will be determined by the technical idea of the scope of the appended claims, and also will be understood as not being limited to the literal description in itself, but reaching the equivalent technical values of the inventive concept.

What is claimed is:

1. A mobile device system for remote starting and management of a vehicle comprising:

a wrist watch device provided in a wrist watch form, the wrist watch device being configured to be converted from an idle state into an activated state to generate a response signal when a wake-up signal wirelessly transmitted from the outside is received, wirelessly transmit the response signal to the outside, and execute a task for communicating with a vehicle on the basis of a real-time operating system; and a vehicle device provided in the vehicle, the vehicle device being configured to wirelessly transmit the wake-up signal to the outside of the vehicle, receive the response signal wirelessly transmitted from the wrist watch device in response to the transmitted wake-up signal, and analyze the response signal to control an operation of the vehicle, wherein the vehicle device comprises a location recognition part configured to recognize a location of the vehicle, and is configured to send location information of the vehicle to the wrist watch device when an ignition of the vehicle is switched off, and wherein the wrist watch device comprises a vehicle parking location information provider configured to display the location information of the vehicle on a display part.

2. The mobile device system of claim 1, wherein the vehicle device is configured to transmit the wake-up signal comprising an identifying ID of the vehicle and having a different pattern for each operation of the vehicle, to control different operations of the vehicle.

3. The mobile device system of claim 2, wherein the wrist watch device comprises a received signal analysis part configured to analyze a pattern of the wake-up signal, and wherein the wrist watch device is configured to transmit a response signal corresponding to an analyzed pattern of the vehicle.

4. The mobile device system of claim 1, wherein the vehicle device comprises at least one low frequency transmitter configured to transmit the wake-up signal having a frequency of 10-150 kHz, and wherein the wrist watch device comprises a low frequency receiver configured to receive the wake-up signal having a frequency of 10-150 kHz.

5. The mobile device system of claim 1, wherein the wrist watch device comprises a wireless communication part configured to perform wireless communication with the vehicle device and a status converter part, the status converter part being configured to convert the wireless communication part into the activated state according to the wakeup signal, and activate a function corresponding to a pattern of the wake-up signal.

6. The mobile device system of claim 1, wherein the wrist watch device comprises:

a received signal strength measurement part configured to measure a received signal strength of the wake-up signal; and a wrist watch control part configured to generate the response signal comprising the received signal strength, wherein the vehicle device comprises:

a response signal strength measurement part configured to measure a response signal strength of the response signal; and a vehicle control part, the vehicle control part being configured to recognize a distance between the wrist watch device and the vehicle based on the received signal strength and the response signal strength, and open a door or a trunk of the vehicle or start the vehicle depending on the recognized distance.

7. The mobile device system of claim 1, wherein the vehicle device is configured to transmit the wake-up signal having a predetermined pattern to transmit a vehicle information to the wrist watch device, wherein the wrist watch device is configured to recognize a pattern of the wake-up signal to stop an executing task and a wireless communication connection with other device, and set a wireless communication connection with the vehicle device to receive the vehicle information.

8. The mobile device system of claim 7, wherein the wrist watch device comprises:

a vehicle information management part, the vehicle information management part being configured to display the vehicle information on a display part; and an alarm part configured to generate an alarm depending on the vehicle information by at least one selected from a speaker and a vibration motor.

9. The mobile device system of claim 7, wherein the vehicle information comprises at least one selected from a door opening status, a startup status, a fuel status, a light lamp status, a tire pressure status, and a vehicle usage record.

10. The mobile device system of claim 1, wherein the wrist watch device is configured to send the response signal comprising an unique ID to the vehicle device, and wherein the vehicle device is configured to open the door or trunk, or start the vehicle, after performing an user authentication using the unique ID.

11. The mobile device system of claim 10, wherein the wrist watch device further comprises at least one selected from a motion recognition part and a speech recognition part, wherein the motion recognition part is configured to recognize a predetermined user's gesture, and the speech recognition part is configured to recognize a predetermined user's speech or voiceprint, and wherein the wrist watch device additionally authenticates whether a user is authenticated to the vehicle or not by at least one selected from the motion recognition part and the speech recognition part.

12. The mobile device system of claim 1, wherein the wrist watch device comprises a vehicle environment setting part configured to set a vehicle environment information corresponding to a user, and send the vehicle environment information to the vehicle device.

13. The mobile device system of claim 12, wherein the vehicle environment information comprises at least one selected from a seat, a back mirror, a side mirror, and a navigation record of the vehicle.

14. The mobile device system of claim 12, wherein the vehicle device is configured to control an environment of the vehicle depending on the vehicle environment information.

15. The mobile device system of claim 1, wherein the vehicle device is configured to transmit wake-up signals, each of the wake-up signals comprising an identifying ID of the vehicle, wherein the wake-up signals are transmitted for different operations of the vehicle, and have different patterns for each operation of the vehicle, to control the different operations of the vehicle, the wrist watch device comprises a received signal analysis part configured to analyze a pattern of the wake-up signal received, and the wrist watch device is configured to transmit a response signal corresponding to the analyzed pattern to the vehicle.

16. A mobile device system for remote starting and management of a vehicle comprising:

a wrist watch device provided in a wrist watch form, the wrist watch device being configured to be converted from an idle state into an activated state to generate a response signal when a wake-up signal wirelessly transmitted from the outside is received, wirelessly transmit the response signal to the outside, and execute a task for communicating with a vehicle on the basis of a real-time operating system; and a vehicle device provided in the vehicle, the vehicle device being configured to wirelessly transmit the wake-up signal to the outside of the vehicle, receive the response signal wirelessly transmitted from the wrist watch device in response to the transmitted wake-up signal, and analyze the response signal to control an operation of the vehicle, wherein the wrist watch device is configured to save a vehicle information of each of a plurality of vehicles respectively, and transmit the response signal to the outside to control an operation of a corresponding vehicle by using the vehicle information.

[17. A mobile device system for remote starting and management of a vehicle comprising:

a wrist watch device provided in a wrist watch form, the wrist watch device being configured to be converted from an idle state into an activated state to generate a response signal when a wake-up signal wirelessly transmitted from the outside is received, wirelessly transmit the response signal to the outside, and execute a task for communicating with a vehicle on the basis of a real-time operating system; and a vehicle device provided in the vehicle, the vehicle device being configured to wirelessly transmit the wake-up signal to the outside of the vehicle, receive the response signal wirelessly transmitted from the wrist watch device in response to the transmitted wake-up signal, and analyze the response signal to control an operation of the vehicle, wherein the wrist watch device is configured to:

remotely receive a vehicle information and a restricted time information saved in a different device to temporarily control or manage the vehicle remotely in restricted time, or remotely transmit the restricted time information and the vehicle information to the different device for the different device to remotely control or manage the vehicle temporarily in a restricted time.]

18. A wrist watch device provided in a wrist watch form, the wrist watch device being configured to:

be converted from an idle state into an activated state when a wake-up signal wirelessly transmitted from a vehicle is received, to generate a response signal, wirelessly transmit the response signal to the outside, and execute a task for communicating with the vehicle on the basis of a real-time operating system, wherein the wrist watch device is configured to save a vehicle information of each of a plurality of vehicles respectively, and transmit the response signal to the outside to control an operation of a corresponding vehicle by using the vehicle information.

19. The device of claim 18, wherein the wrist watch device has a multiple task management function, the multiple task management function comprising: receiving the wake-up signal transmitted in different patterns depending on operations from the vehicle; recognizing a pattern of the wake-up signal to stop a task communicating with another device or a task performing another work; setting a wireless communication connection with a vehicle device provided in the vehicle to receive a vehicle information; and executing the stopped task.

20. The device of claim 18, wherein the wrist watch comprises:

a wireless communication part configured to perform a wireless communication with a vehicle device provided in the vehicle;

a status converter part configured to convert the wireless communication part into an activated state depending on the wake-up signal to activate a function corresponding to a pattern of the wake-up signal;

a received signal strength measurement part configured to measure a received signal strength of the wake-up signal;

a wrist watch control part configured to generate the response signal comprising the received signal strength;

a vehicle information management part configured to display a vehicle information, which is received from the vehicle device, on a display part;

an alarm part configured to generate an alarm depending on the vehicle information by at least one selected from a vibrating motor or a speaker; and a vehicle environment setting part configured to set a vehicle environment information corresponding to a user.

*21. A vehicle comprising:*

*a GPS module configured to determine a current location of the vehicle;*

*a wireless communication module configured to transmit and receive wireless signals; and*

*at least one controller configured*

*upon pressing of a start button of the vehicle, to cause the wireless communication module to transmit a wireless signal requesting for a response,*

*upon receipt of a response to the wireless signal from a portable wireless device, to process the response for authenticating the portable wireless device,*

*subsequently while the vehicle is running, to cause the wireless communication module to transmit data indicative of the vehicle's current status to the portable wireless device, and*

*upon switching off the vehicle, to cause the wireless communication module to transmit the vehicle's current location to the portable wireless device for storing therein such that a user of the portable wireless device can view the vehicle's parking location on the portable wireless device or another device of the user for locating the vehicle's parking location later when returning to the vehicle.*

*22. The vehicle of claim 21, wherein the portable wireless device comprises a wrist watch device.*

*23. The vehicle of claim 21, wherein the vehicle's current status comprises at least one selected from the group consisting of a door of the vehicle open, engine oil change needed, and fuel being low.*

* * * * *